(12) United States Patent
Yang et al.

(10) Patent No.: US 10,447,726 B2
(45) Date of Patent: Oct. 15, 2019

(54) MITIGATING ATTACKS ON SERVER COMPUTERS BY ENFORCING PLATFORM POLICIES ON CLIENT COMPUTERS

(71) Applicant: Shape Security, Inc., Mountain View, CA (US)

(72) Inventors: Siying Yang, Cupertino, CA (US); Shuman Ghosemajumder, Mountain View, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 16/190,015

(22) Filed: Nov. 13, 2018

(65) Prior Publication Data
US 2019/0081977 A1 Mar. 14, 2019

Related U.S. Application Data

(63) Continuation of application No. 15/068,468, filed on Mar. 11, 2016, now Pat. No. 10,129,289.

(51) Int. Cl.
*G06F 21/00* (2013.01)
*H04L 29/06* (2006.01)
(Continued)

(52) U.S. Cl.
CPC ........ *H04L 63/1441* (2013.01); *G06F 21/556* (2013.01); *G06F 21/562* (2013.01);
(Continued)

(58) Field of Classification Search
None
See application file for complete search history.

(56) References Cited

U.S. PATENT DOCUMENTS

| 5,509,076 A | 4/1996 | Sprunk |
| 6,654,707 B2 | 11/2003 | Wynn |

(Continued)

FOREIGN PATENT DOCUMENTS

| CN | 101471818 | 5/2011 |
| WO | WO2008/095018 | 8/2008 |

(Continued)

OTHER PUBLICATIONS

Graubner, Pablo et al. Dynalize: Dynamic Analysis of Mobile Apps in a Platform-as-a-Service Cloud. 2015 IEEE 8th International Conference on Cloud Computing. https://ieeexplore.ieee.org/stamp/stamp.jsp?tp=&arnumber=7214136 (Year: 2015).*

(Continued)

*Primary Examiner* — Jeremiah L Avery
(74) *Attorney, Agent, or Firm* — Hickman Palermo Becker Bingham LLP

(57) ABSTRACT

In an embodiment, a computer system is configured to receive, from a client computer, a request with one or more values; determine, based on the one or more values, whether the request is from a platform-specific application compiled for a first computer platform; determine, based on the one or more values, whether the platform-specific application is being executed within an emulator being executed by a second computer platform, wherein the second computer platform is different than the first computer platform.

20 Claims, 4 Drawing Sheets

(51) Int. Cl.
*G06F 21/55* (2013.01)
*G06F 21/57* (2013.01)
*G06F 21/56* (2013.01)

(52) U.S. Cl.
CPC .......... *G06F 21/57* (2013.01); *H04L 63/1425* (2013.01); *H04L 63/20* (2013.01); *G06F 2221/033* (2013.01)

(56) References Cited

U.S. PATENT DOCUMENTS

| | | | |
|---|---|---|---|
| 7,058,699 | B1 | 6/2006 | Chiou |
| 7,107,347 | B1* | 9/2006 | Cohen ............... H04L 29/12009 709/218 |
| 7,398,553 | B1 | 7/2008 | Li |
| 7,424,720 | B2 | 9/2008 | Chagoly |
| 7,464,326 | B2 | 12/2008 | Kawai |
| 7,849,502 | B1 | 12/2010 | Bloch et al. |
| 7,870,610 | B1 | 1/2011 | Mitchell |
| 7,895,653 | B2 | 2/2011 | Calo |
| 8,170,020 | B2 | 5/2012 | Oliver |
| 8,195,953 | B1 | 6/2012 | Yue |
| 8,453,126 | B1 | 5/2013 | Ganelin |
| 8,555,388 | B1 | 10/2013 | Wang |
| 8,561,193 | B1 | 10/2013 | Srivastava |
| 8,578,499 | B1 | 11/2013 | Zhu |
| 8,589,405 | B1 | 11/2013 | Estan |
| 8,650,648 | B2 | 2/2014 | Howard et al. |
| 8,677,481 | B1 | 3/2014 | Lee |
| 8,689,330 | B2 | 4/2014 | Sinn et al. |
| 8,713,684 | B2* | 4/2014 | Bettini .................... G06F 21/57 726/25 |
| 8,726,394 | B2 | 5/2014 | Maor |
| 8,739,284 | B1 | 5/2014 | Gardner |
| 8,752,208 | B2 | 6/2014 | Shulman |
| 8,762,962 | B2 | 6/2014 | Ben-Artzi et al. |
| 8,843,820 | B1 | 9/2014 | Kay |
| 8,849,985 | B1 | 9/2014 | Colton |
| 8,875,266 | B2* | 10/2014 | Chambers ............... G06F 21/10 726/7 |
| 8,954,732 | B1* | 2/2015 | Watsen ................. H04L 9/3263 713/157 |
| 8,997,226 | B1 | 3/2015 | Call |
| 9,043,924 | B2 | 5/2015 | Maor |
| 9,152,694 | B1* | 10/2015 | Padidar ................... G06F 21/51 |
| 9,158,893 | B2 | 10/2015 | Call |
| 9,225,729 | B1 | 12/2015 | Moen |
| 9,225,737 | B2 | 12/2015 | Call |
| 9,258,328 | B2 | 2/2016 | Ibatullin et al. |
| 9,456,050 | B1 | 9/2016 | Lepeska |
| 9,537,888 | B1 | 1/2017 | McClintock |
| 9,609,006 | B2 | 3/2017 | Call |
| 9,628,498 | B1 | 4/2017 | Aziz |
| 9,639,699 | B1 | 5/2017 | Kurupati |
| 9,646,140 | B2 | 5/2017 | Horadan |
| 9,680,850 | B2 | 6/2017 | Rapaport |
| 9,686,300 | B1 | 6/2017 | Kurupati |
| 9,705,902 | B1 | 7/2017 | Call |
| 9,823,851 | B2* | 11/2017 | Beale ..................... G06F 3/061 |
| 9,906,544 | B1 | 2/2018 | Kurupati |
| 10,165,004 | B1 | 12/2018 | Mehta |
| 2002/0199116 | A1 | 12/2002 | Hoene |
| 2004/0088651 | A1 | 5/2004 | McKnight |
| 2005/0108554 | A1 | 5/2005 | Rubin |
| 2005/0172338 | A1 | 8/2005 | Sandu |
| 2005/0198099 | A1 | 9/2005 | Motsinger |
| 2005/0216770 | A1 | 9/2005 | Rowett |
| 2005/0240999 | A1 | 10/2005 | Rubin |
| 2005/0251536 | A1 | 11/2005 | Harik |
| 2005/0278626 | A1 | 12/2005 | Malik |
| 2006/0053295 | A1 | 3/2006 | Madhusudan |
| 2006/0101047 | A1 | 5/2006 | Rice |
| 2006/0174323 | A1 | 8/2006 | Brown |
| 2006/0195588 | A1 | 8/2006 | Pennington |
| 2006/0230288 | A1 | 10/2006 | Fox |
| 2006/0288418 | A1 | 12/2006 | Yang |
| 2007/0011295 | A1 | 1/2007 | Hansen |
| 2007/0064617 | A1 | 3/2007 | Reves |
| 2007/0088955 | A1 | 4/2007 | Lee |
| 2007/0234070 | A1 | 10/2007 | Horning |
| 2008/0208785 | A1 | 8/2008 | Trefler |
| 2008/0320567 | A1 | 12/2008 | Shulman |
| 2009/0070459 | A1 | 3/2009 | Cho |
| 2009/0099988 | A1 | 4/2009 | Stokes |
| 2009/0199297 | A1 | 8/2009 | Jarrett |
| 2009/0241174 | A1 | 9/2009 | Rajan |
| 2009/0292791 | A1 | 11/2009 | Livshits |
| 2010/0088404 | A1 | 4/2010 | Mani |
| 2010/0106611 | A1 | 4/2010 | Paulsen |
| 2010/0142382 | A1 | 6/2010 | Jungck et al. |
| 2010/0186089 | A1 | 7/2010 | Fu |
| 2010/0218253 | A1 | 8/2010 | Sutton |
| 2010/0235637 | A1 | 9/2010 | Lu |
| 2010/0235910 | A1 | 9/2010 | Ku |
| 2010/0287132 | A1 | 11/2010 | Hauser |
| 2011/0035733 | A1 | 2/2011 | Horning |
| 2011/0154308 | A1 | 6/2011 | Lobo |
| 2011/0225234 | A1 | 9/2011 | Amit |
| 2011/0231305 | A1 | 9/2011 | Winters |
| 2011/0320816 | A1 | 12/2011 | Yao |
| 2012/0036576 | A1 | 2/2012 | Iyer |
| 2012/0072968 | A1* | 3/2012 | Wysopal ............. G06F 11/3612 726/1 |
| 2012/0090030 | A1 | 4/2012 | Rapaport |
| 2012/0198528 | A1 | 8/2012 | Baumhof |
| 2012/0254727 | A1 | 10/2012 | Jain |
| 2012/0255006 | A1 | 10/2012 | Aly et al. |
| 2012/0324236 | A1 | 12/2012 | Srivastava |
| 2013/0042294 | A1* | 2/2013 | Colvin .................... G06F 21/53 726/1 |
| 2013/0047255 | A1 | 2/2013 | Dalcher |
| 2013/0086679 | A1 | 4/2013 | Beiter |
| 2013/0219492 | A1 | 8/2013 | Call |
| 2013/0263264 | A1 | 10/2013 | Klein |
| 2013/0273882 | A1 | 10/2013 | Walsh |
| 2014/0040051 | A1 | 2/2014 | Ovick |
| 2014/0096194 | A1 | 4/2014 | Bhogavilli |
| 2014/0208198 | A1 | 7/2014 | Ayoub |
| 2014/0298469 | A1 | 10/2014 | Marion |
| 2014/0304816 | A1 | 10/2014 | Klein |
| 2014/0310392 | A1 | 10/2014 | Ho |
| 2015/0058992 | A1 | 2/2015 | El-Moussa |
| 2015/0067031 | A1 | 3/2015 | Acharya |
| 2015/0067866 | A1 | 3/2015 | Ibatullin |
| 2015/0112892 | A1 | 4/2015 | Kaminsky |
| 2015/0242636 | A1* | 8/2015 | Khan ..................... G06F 21/577 726/25 |
| 2015/0262183 | A1 | 9/2015 | Gervais |
| 2015/0278491 | A1 | 10/2015 | Horning |
| 2015/0281263 | A1 | 10/2015 | Mclaughlin |
| 2015/0295948 | A1* | 10/2015 | Hassell ............... H04L 63/1441 726/25 |
| 2015/0309813 | A1* | 10/2015 | Patel ........................ G06F 8/75 703/22 |
| 2015/0358338 | A1 | 12/2015 | Zeitlin |
| 2015/0379266 | A1 | 12/2015 | Mclaughlin |
| 2016/0005029 | A1 | 1/2016 | Ivey |
| 2016/0072829 | A1 | 3/2016 | Call |
| 2016/0119344 | A1 | 4/2016 | Dos Santos |
| 2016/0342793 | A1 | 11/2016 | Hidayat |
| 2016/0344769 | A1 | 11/2016 | Li |
| 2016/0378989 | A1* | 12/2016 | Park ...................... G06F 21/566 726/23 |
| 2017/0012960 | A1 | 1/2017 | Idika |
| 2017/0013012 | A1 | 1/2017 | Hansen |
| 2017/0048260 | A1 | 2/2017 | Peddemors |
| 2017/0201540 | A1 | 7/2017 | Call |
| 2017/0235954 | A1 | 8/2017 | Kurupati |
| 2017/0237766 | A1 | 8/2017 | Mattson |
| 2017/0257383 | A1 | 9/2017 | Ficarra |
| 2017/0257385 | A1 | 9/2017 | Overson |
| 2017/0293748 | A1 | 10/2017 | Kurupati |

(56) References Cited

U.S. PATENT DOCUMENTS

| | | | |
|---|---|---|---|
| 2018/0205747 A1 | 7/2018 | Ficarra | |
| 2018/0255154 A1 | 9/2018 | Li | |
| 2019/0081977 A1 | 3/2019 | Yang | |

FOREIGN PATENT DOCUMENTS

| | | |
|---|---|---|
| WO | WO2008/095031 | 8/2008 |
| WO | WO2008/130946 | 10/2008 |
| WO | WO2017/007705 | 1/2017 |
| WO | WO2017/007936 | 1/2017 |
| WO | WO2017/074622 | 5/2017 |

OTHER PUBLICATIONS

Scott, Kevin; Davidson, Jack. Safe Virtual Execution Using Software Dynamic Translation. Proceedings, 2002 18th Annual Computer Security Applications Conference. https://ieeexplore.ieee.org/stamp/stamp.jsp?tp=&arnumber=1176292 (Year: 2002).*

Manatunga, Dilan et al. Hardware Support for Safe Execution of Native Client Applications. IEEE Computer Architecture Letters, vol. 14, Issue: 1. https://ieeexplore.ieee.org/stamp/stamp.jsp?tp=&arnumber=6766786 (Year: 2014).*

Jhi, Yoon-Chan et al. Program Characterization Using Runtime Values and Its Application to Software Plagarism Detection. IEEE Transactions on Software Engineering, vol. 41, Issue: 9. https://ieeexplore.ieee.org/stamp/stamp.jsp?tp=&arnumber=7076635 (Year: 2015).*

Scott, Kevin; Davidson, Jack. Safe Virtual Execution Using Software Dynamic Translation. 2002 18th Annual Computer Security Applications Conference, Proceedings. https://ieeexplore.ieee.org/stamp/stamp.jsp?tp=&arnumber=1176292 (Year: 2002).*

NOA, dated Feb. 7, 2019, re: Siying Yang, U.S. Appl. No. 16/190,015, filed Nov. 13, 2018.

CTNF, dated Mar. 9, 2017, re: Siying Yang, U.S. Appl. No. 14/925,547, filed Oct. 28, 2015.

NOA, dated Apr. 23, 2015, re: Justin Call, U.S. Appl. No. 13/527,025, filed Jun. 19, 2012.

CTFR, dated Feb. 10, 2015, re: Justin Call, U.S. Appl. No. 13/527,025, filed Jun. 19, 2012.

CTNF, dated Nov. 2, 2012, re: Justin Call, U.S. Appl. No. 13/527,025, filed Jun. 19, 2012.

CTFR, dated Apr. 23, 2013, re: Justin Call, U.S. Appl. No. 13/527,025, filed Jun. 19, 2012.

CTNF, dated Aug. 4, 2014, re: Justin Call, U.S. Appl. No. 13/527,025, filed Jun. 19, 2012.

NOA, dated Jun. 1, 2015, re: Justin Call, U.S. Appl. No. 13/527,025, filed Jun. 19, 2012.

CTNF, dated Feb. 26, 2015, re: Justin Call, U.S. Appl. No. 14/055,576, filed Oct. 16, 2013.

NOA, dated Aug. 21, 2015, re: Justin Call, U.S. Appl. No. 15/055,576, filed OCt. 16, 2013.

CTNF, dated May 5, 2015, re: Justin Call, U.S. Appl. No. 14/110,659, filed Oct. 8, 2013.

NOA, dated Aug. 29, 2015, re: Daniel Moen, U.S. Appl. No. 14/160,107, filed Jan. 21, 2014.

CTNF, dated Jun. 27, 2014, re: Justin Call, U.S. Appl. No. 14/255,248, filed Apr. 17, 2014.

NOA, dated Nov. 11, 2014, re: Justin Call, U.S. Appl. No. 14/255,248, filed Apr. 17, 2014.

NOA, dated Dec. 24, 2014, re: Justin Call, U.S. Appl. No. 14/255,248, filed Apr. 17, 2014.

CTNF, dated Sep. 1, 2015, re: Ariya Hidayat, U.S. Appl. No. 15/293,895, filed Jun. 2, 2014.

NOA, dated Mar. 30, 2016, re: Ariya Hidayat, U.S. Appl. No. 14/293,895, filed Jun. 2, 2014.

NOA, dated Jul. 21, 2016, re: Siyang Yang, U.S. Appl. No. 14/541,062, filed Nov. 13, 2014.

CTNF, dated Feb. 23, 2016, re: Siying Yang, U.S. Appl. No. 14/541,062, filed Nov. 13, 2014.

CTNF, dated May 8, 2015, re: Timothy Peacock, U.S. Appl. No. 14/570,632, filed Dec. 15, 2014.

NOA, dated Dec. 18, 2015, re: Timothy Peacock, U.S. Appl. No. 14/570,632, filed Dec. 15, 2014.

CTNF, dated Mar. 17, 2016, re: Justin Call, U.S. Appl. No. 14/672,879, filed Mar. 30, 2015.

CTNF, dated Nov. 10, 2016, re: Nwokedi Idika, U.S. Appl. No. 14/728,621, filed Jun. 2, 2015.

CTNF, dated Mar. 14, 2016, re: Justin Call, U.S. Appl. No. 14/874,717, filed Oct. 5, 2015.

NOA, dated Apr. 28, 2016, re: Justin Call, U.S. Appl. No. 14/874,717, filed Oct. 5, 2015.

NOA, dated Nov. 16, 2016, re: Justin Call, U.S. Appl. No. 14/980,409, filed Dec. 28. 2015.

CTFN, dated Aug. 2, 2016, re: Justin Call, U.S. App. No. 14/980,409, filed Dec. 28, 2015.

CTFR, dated Nov. 18, 2016, re: Justin D. Call, U.S. Appl. No. 14/672,879, filed Mar. 30, 2015.

CTNF, dated Jun. 1, 2017, re: Siying Yang, U.S. Appl. No. 14/942,769, filed Nov. 16, 2015.

CTNF, dated Jun. 2, 2017, re: Ariya Hidayat, U.S. Appl. No. 15/224,978, filed Aug. 1, 2016.

CTNF, dated Apr. 7, 2017, re: Ya Zhao, U.S. Appl. No. 14/861,906, filed Sep. 22, 2015.

CTNF, dated May. 25, 2017, re: Daniel G. Moen, U.S. Appl. No. 14/980,231, filed Dec. 28, 2015.

CTNF, dated Jul. 26, 2017, re: Bei Zhang, U.S. App. No. 14/859,084, filed Sep. 18, 2015.

CTNF, dated Jun. 21, 2017, re: Zhiwei Li, U.S. Appl. No. 14/718,736, filed May. 21, 2015.

CTNF, dated Aug. 30, 2017, re: Justin D. Call, U.S. Appl. No. 15/470,715, filed Mar. 27, 2017.

CTFR, dated Sep. 5, 2017, re: Siying Yang, U.S. Appl. No. 14/925,547, filed Oct. 28, 2015.

CTNF, dated Oct. 19, 2017, re: Jarrod S. Overson, U.S. Appl. No. 15/059,080, filed Mar. 2, 2016.

NOA, dated Oct. 25, 2017, re: Michael J. Ficarra, U.S. Appl. No. 15/060,322, filed Mar. 3, 2016.

CTNF, dated Nov. 13, 2017, re: Nwokedi Idika, U.S. Appl. No. 14/728,596, filed Jun. 2, 2015.

CTNF, dated Dec. 13, 2017, re: Justin D. Call, U.S. Appl. No. 15/645,787, filed Jul. 10, 2017.

NOA, dated Dec. 18, 2017, re: Yao Zhao, U.S. Appl. No. 14/861,906, filed Sep. 22, 2015.

NOA, dated Jan. 5, 2018, re: Yao Zhao, U.S. Appl. No. 14/861,906, filed Sep. 22, 2015.

NOA, dated Jan. 2018, 2009, re: Justin D. Call, U.S. Appl. No. 15/470,715, filed Mar. 27, 2017.

CTFR, dated Jan. 25, 2018, re: Siying Yang, U.S. Appl. No. 14/942,769, filed Nov. 16, 2015.

CTNF, dated Feb. 7, 2017, re: daniel G. Moen, U.S. Appl. No. 14/980,231, filed Dec. 28, 2015.

CTFR, dated Jan. 10, 2018, re: Bei Zhang, U.S. Appl. No. 14/859,084, filed Sep. 8, 2015.

NOA, dated Jan. 25, 2018, re: Zhiwei Li, U.S. Appl. No. 14/718,736, filed May 5, 2015.

CTNF, dated Mar. 30, 2018, re: Michael J. Ficarra, U.S. Appl. No. 15/060,380, filed Mar. 3, 2016.

CTNF, dated Apr. 19, 2018, re: Michael J. Ficarra, U.S. Appl. No. 15/919,034, filed Mar. 12, 2018.

CTNF, dated May 15, 2018, re: Marc R. Hansen, U.S. Appl. No. 15/202,755, filed Jun. 6, 2016.

CTFR, dated May 10, 2018, re: Nwokedi Idika, U.S. Appl. No. 14/728,596, filed Jun. 2, 2015.

CTNF, dated Feb. 16, 2018, re: Siying Yang, U.S. Appl. No. 15/068,468, filed Mar. 11, 2016.

NOA, dated May 18, 2018, re: Siying Yang, U.S. Appl. No. 14/942,769, filed Nov. 16, 2015.

CTNF, dated May 23, 2018, re: Bei Zhang, U.S. Appl. No. 14/859,084, filed Sep. 18, 2015.

(56) References Cited

OTHER PUBLICATIONS

CTFR, dated May 17, 2018, re: Jarrod S. Overson, U.S. Appl. No. 15/059,080, filed Mar. 2, 2016
CTNF, dated Jun. 7, 2018, re: Siying Yang, U.S. Appl. No. 14/925,547, filed Oct. 28, 2015.
CTNF, dated Jun. 29, 2018, re: Timothy Dylan Peacock, U.S. Appl. No. 15/137,824, filed Apr. 25, 2016.
CTNF, dated Feb. 1, 2018, re: Nwokedi Idika, U.S. Appl. No. 15/204,710, filed Jul. 7, 2016.
NOA, dated Aug. 13, 2018, re: Daniel G. Moen, U.S. Appl. No. 14/980,231, filed Dec. 28, 2015.
NOA, dated Sep. 5, 2018, re: Daniel G. Moen, U.S. Appl. No. 14/980,231, filed Dec. 28, 2015.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 07, 2016.
CTNF, dated Sep. 19, 2018, re: Eli Mattson, U.S. Appl. No. 15/430,224, filed Feb. 10, 2017.
CTFR, dated Sep. 11, 2018, re: Michael J. Ficarra, U.S. Appl. No. 15/060,380, filed Mar. 3, 2016.
CTFR, dated Nov. 1, 2018, re: Marc. R. Hansen, U.S. Appl. No. 15/202,755, filed Jul. 6, 2016.
CTFR, dated Nov. 30, 2018, re: Siying Yang, U.S. Appl. No. 14/925,547, filed Oct. 28, 2015
NOA, dated Nov. 27, 2018, re: Nwokedi Idika, U.S. Appl. No. 15/204,710, filed Jul. 7, 2016.
CTNF, dated Oct. 5, 2018, re: Zhiwei Li, U.S. Appl. No. 15/968,573, filed May. 1, 2018.
NOA, dated Sep. 12, 2018, re: Justin D. Call, U.S. Appl. No. 15/645,787, filed Jul. 10, 2017.
CTNF, dated Nov. 29, 2018, re: Jarrod S. Overson, U.S. Appl. No. 15/059,080, filed Mar. 2, 2016.
NOA, dated Jan. 3, 2019, re: Bei Zhang, U.S. Appl. No. 14/859,084, filed Sep. 18, 2015.
CTNF, deted Jan. 24, 2019, re: Nwokedi Idika, U.S. Appl. No. 14/728,596, filed Jun. 2, 2015.
NOA, dated Feb. 6, 2019, re: Eli Mattson, U.S. Appl. No. 15/430,224, filed Feb. 10, 2017.
NOA, dated Mar. 25, 2019, re: Siying Yang, U.S. Appl. No. 14/925,547, filed Oct. 28, 2015.
U.S. Appl. No. 16/190,015, dated Mar. 14, 3019, Siying Yang.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging Dom Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Jun. 3, 2013, PCT/US13/26516.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pages 1-2, Jan. 11, 2010.
"Custom Elements: defining new elements in HTML", Dec. 8, 2013, 15 pages. Dec. 8, 2013.

* cited by examiner

MITIGATING ATTACKS ON SERVER COMPUTERS BY ENFORCING PLATFORM POLICIES ON CLIENT COMPUTERS

BENEFIT CLAIM

This application claims the benefit under 35 U.S.C. § 120 as a Continuation of application Ser. No. 15/068,468, filed Mar. 11, 2016, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s). SUGGESTED GROUP ART UNIT: 2447 (SAME AS PARENT REFERENCED ABOVE); SUGGESTED CLASSIFICATION: 109/117 (SAME AS PARENT REFERENCED ABOVE).

FIELD OF THE DISCLOSURE

The present disclosure generally relates to security techniques applicable to client/server computer system security, and relates more specifically to techniques for detecting, at a server computer, whether requests from a platform-specific client application are being sent by the application being executed by a target client-computer platform or by the application being executed by an emulator on a computer platform that is not the target platform.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer platform is a particular set of hardware components or architectures, or software components or architectures. One computer platform can include one or more different processors, operating systems, displays, inputs, or other hardware or software components that another computer platform does not have. For example, a particular model of a mobile device may be a particular computer platform that includes one or more processors and an operating system designed to minimize the amount of power consumed while the mobile device is not actively being used by a user. A particular desktop model computer platform may include a plurality of high-performance power intensive processors configured to perform computationally expensive simulations.

A platform-specific application is a platform-specific application that is specifically configured to be executed by a particular computer platform. A computer platform that a platform-specific application is specifically configured to be executed by may be referred to as a target platform. Platform-specific applications can be developed with one or more computing programming languages, such as Java, Objective C, and Swift. After a platform-specific application is configured for a particular computer platform, copies of the platform-specific application can be downloaded or shared. A device or computer that has the particular computer platform can execute the platform-specific application.

A platform-specific application can include platform-specific features. For example, a first mobile device platform may comprise, a first operating system ("OS"), GPS, and wireless communication system. The first OS executing on the first mobile device platform may provide one or more first interfaces for a first platform-specific application to retrieve the current global position of the first mobile device and send the position data to a server computer.

A platform-specific application for a particular computer platform need not be compatible for another computer platform. For example, a second mobile device platform may comprise, a second OS, GPS, and wireless communication system. The second OS executing on the second mobile device platform may provide one or more second interfaces for a second platform-specific application to retrieve the current global position of the second mobile device and send the position data to the server computer. However, if the one or more first interfaces are different than the one or more second interfaces, then the first platform-specific application is not compatible with the second mobile device platform.

An emulator is software that can execute a platform-specific application by emulating the target computer platform even though the emulator may be executed by a different computer platform. For example, if a developer compiles source code to generate a platform-specific application for a target mobile device platform, then the developer can test the platform-specific application on the developer's desktop computer platform by executing an emulator on the desktop computer platform, and instructing the emulator to execute the compiled platform-specific application while emulating the target mobile device platform.

A server computer that receives data from a platform-specific application may be susceptible to similar attacks used against server computers that are hosting or serving data in response to one or more requests. For example, if a server computer receives location data over HyperText Transfer Protocol ("HTTP") using a particular Uniform Resource Locator ("URL") from one or more platform-specific applications, then the server computer may receive location data from an attacker sending false or fabricated location data over HTTP using the same particular URL.

Platform-specific applications for particular computer platforms, such as mobile devices, may not be executable by, or compatible with, other computer platforms, such as desktop computer platforms. So, attackers may resort to "manually" sending bad data to server computers via the platform-specific application. For example, an attacker may install and execute a platform-specific application on a target mobile device, input false data into one or more fields, and cause the platform-specific application to send a request that includes the bad data to the server computer.

Manually sending bad data or other malicious requests to a server computer can be time consuming and fail to impact the intended victim in a meaningful way. Furthermore, an attacker may not have access to the target computer platform for the platform-specific application that the attacker wants to exploit. Instead, an attacker can execute an emulator, such as ANDROID EMULATOR or THE SIMULATOR for IOS, on the attacker's desktop computer platform, and instruct the emulator to execute the platform-specific application while emulating the target computer platform. Furthermore, the attacker may use automation tools or scripts that simulate a user providing input into the platform-specific application, which then causes the platform-specific application being executed in the emulator to repetitively send a large number of requests with false data to the server computer. The server may determine that the requests are valid because the requests are from the platform-specific application. Accordingly, the server may process the malicious requests with false data.

Attackers may use emulators and automation tools to commit many types of unauthorized acts, crimes or computer fraud, such as content retrieval or scraping, credential stuffing, ratings manipulation, fake account creation, reserving rival goods attacks, ballot stuffing attacks, password snooping, vulnerability assessments, brute force attacks, click fraud, DDoS attacks, bidding wars, and system fingerprinting attacks. Server administrators and developers may wish to prevent malicious users from attacking a server using a platform-specific application, emulators, and automation tools, while allowing legitimate users to use the platform-specific application as intended. However, determining which requests are generated by a legitimate user using a platform-specific application and a malicious user using the platform-specific application may be difficult.

SUMMARY

The appended claims may serve as a summary of the invention.

Figure 1:
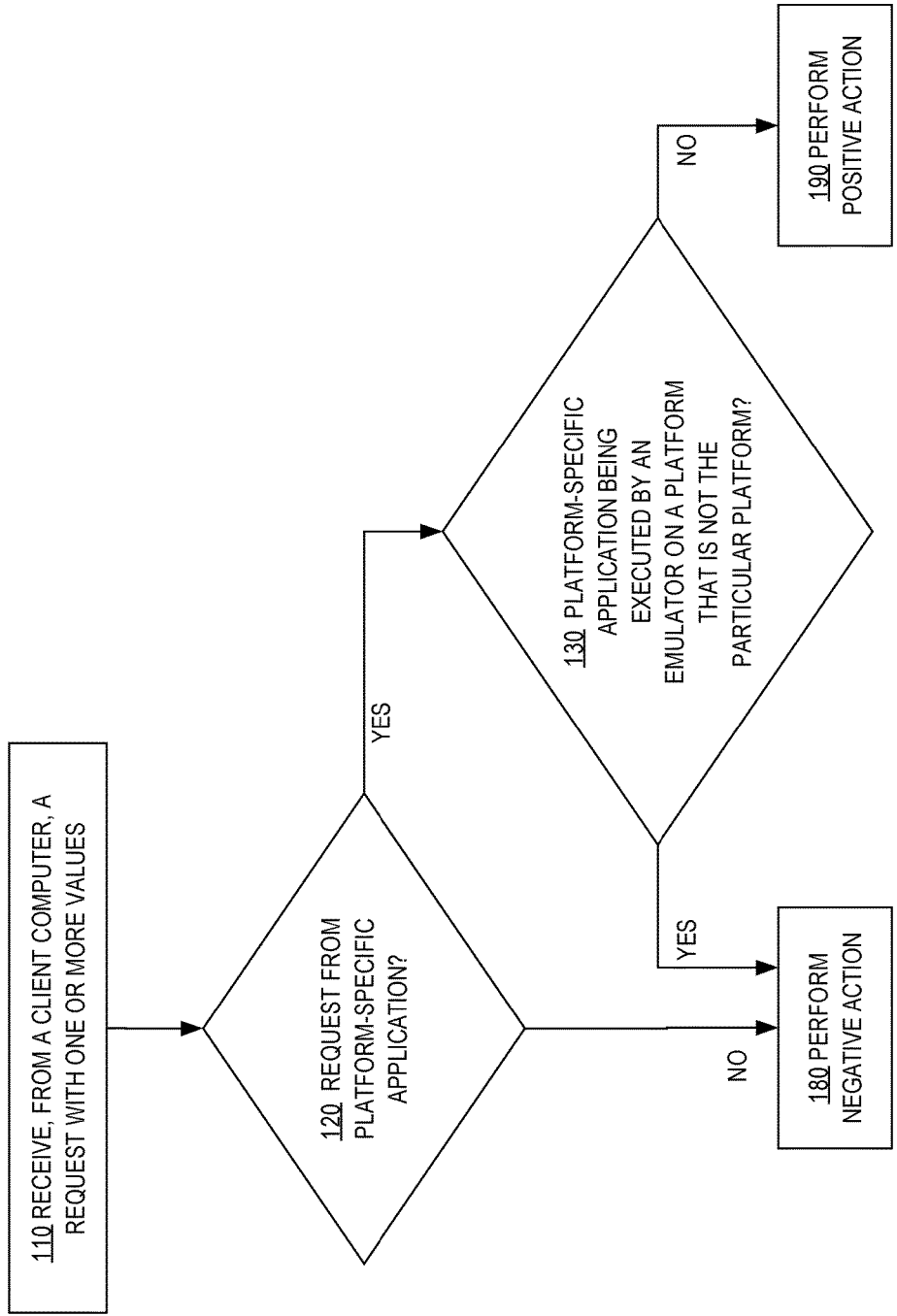
FIG. 1 illustrates a process that an emulator filter may perform to filter requests from a platform-specific application based on whether the platform-specific application is executed by a target computer platform or an emulator on a non-target computer platform, in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, several steps in FIG. 1 and FIG. 3 may reference several components illustrated in FIG. 2 and discussed in detail below, but using the particular arrangement illustrated in FIG. 2 is not required in other embodiments. Furthermore, while the requests discussed in many example embodiments are HyperText Transfer Protocol ("HTTP") requests, in other embodiments, requests may be sent or received using other standard or proprietary protocols, such as SPDY.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or more than one elements. For example, a set of instructions may comprise one or more instructions.

Embodiments are described herein according to the following outline:
1.0 General Overview
2.0 Determining Whether a Request is From a Native Application Executed by a Target Platform or an Emulator on a Non-Target Platform
  2.1 Determining Whether a Request is From a Native Application
  2.2 Determining Whether the Native Application is Being Executed by a Target Computer Platform or an Emulator
    2.2.1 Conditionally Executed Code
    2.2.2 Code that Checks for Hard-to-Simulate Components
    2.2.3 Sending Data to an Emulator Filter
3.0 Example Network Topology for Determining Whether a Request is From a Native Application Executed by the Target Client Computer Platform or by an Emulator
  3.1 Client-Computer Platforms
  3.2 Server Infrastructure
  3.3 Emulator
  3.4 Emulator Filter and Intermediary Computer
  3.5 Storage and Configuration
4.0 Process Overview for Enforcing Platform Policies
  4.1 Receiving one or more Requests from one or more Platform-Specific Applications
  4.2 Determining Whether the Request is from a Platform-Specific Application Executed by an Emulator or a Target Client-Computer Platform
  4.3 Determining Whether Remote Interface is Protected
  4.4 Determining Whether Value(s) are Correctly Signed
  4.5 Determining one or more Actions Based on a Policy and Results of one or more Determinations, and Perform the one or more Actions
  4.6 Negative Actions
  4.7 Positive Actions
5.0 Implementation Mechanisms—Hardware Overview
6.0 Other Aspects of Disclosure 1.0 General Overview In an embodiment, a computer system is configured to receive, from a client computer, a request with one or more values; determine, based on the one or more values, whether the request is from a platform-specific application compiled for a first computer platform; determine, based on the one or more values, whether the platform-specific application is being executed within an emulator being executed by a second computer platform, wherein the second computer platform is different than the first computer platform.

In an embodiment, the set of security instructions, when executed by the one or more processors, further causes the one or more processors to perform a negative action in response to determining that the request is from the platform-specific application being executed within the emulator being executed by the second computer platform.

In an embodiment, the set of security instructions, when executed by the one or more processors, further causes the one or more processors to determine, based on the one or more values, whether the platform-specific application being executed natively by the first computer platform.

In an embodiment, the platform-specific application includes one or more fingerprinting instructions that are conditionally executed if the platform-specific application is executed within the emulator being executed by the second computer platform; the one or more fingerprinting instructions, if executed within the emulator being executed by the second computer platform, cause the client computer to produce one or more first fingerprint values and include in the one or more first fingerprint values in the one or more values in the request; the set of security instructions, when executed by the one or more processors, cause the one or more processors to determine that the request is from the platform-specific application being executed within the emulator being executed by the second computer platform if the one or more values include the one or more first fingerprint values.

In an embodiment, the one or more fingerprinting instructions are configured to generate the one or more fingerprint values using one or more methods; the one or more fingerprinting instructions are configured to periodically to produce one or more different fingerprint values according to one or more different methods.

In an embodiment, the one or more memory devices comprise a policy that defines a plurality of rules, wherein each rule in the set of rules comprises one or more match criteria and one or more actions; the set of security instructions, when executed by the one or more processors, further cause the one or more processors to: determine that a particular rule, among the set of rules, has one or more particular match criteria that are satisfied by the request and one or more particular actions, and in response, perform the one or more particular actions.

2.0 Determining Whether a Request is from a Native Application Executed by a Target Platform or an Emulator on a Non-Target Platform A platform-specific application is an application that is specifically configured to be executed by one or more particular computer platforms. Each of the one or more particular computer platforms may be referred to as a target computer platform. A computer platform that is not a target computer platform for a particular platform-specific application, or an emulator, may be referred to as a non-target computer platform.

An emulator may be software or hardware that emulates or simulates hardware or software components of a target computer platform. However, the emulator may be on, or executed by, a different underlying computer platform. As discussed in detail further herein, although an emulator emulates a particular target computer platform, a non-target computer platform with the emulator is not completely equivalent to the particular target computer platform. An emulator filter can determine whether a request is from a platform-specific application being executed by an emulator or a platform-specific application being executed by a target computer platform by detecting one or more differences between an emulator executing the platform-specific application and a target platform executing the platform-specific application.

Figure 2:
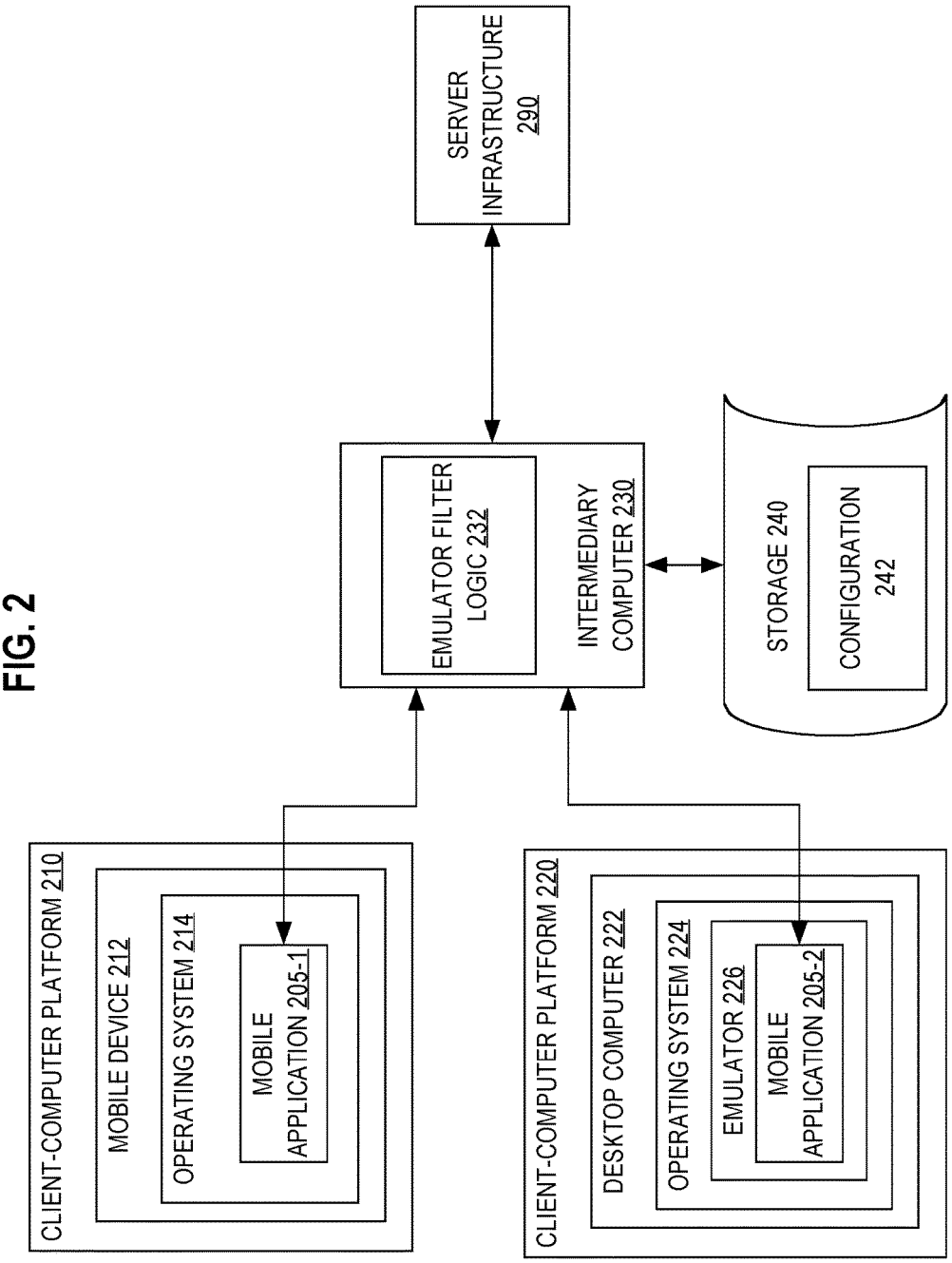
FIG. 2 illustrates a computer system for determining whether a request is from a platform-specific application executed by a target computer platform or an emulator on a non-target computer platform, in an example embodiment.

FIG. 1 illustrates a process that an emulator filter may perform to filter requests from a platform-specific application based on whether the platform-specific application is executed by a target computer platform or an emulator on a non-target computer platform, in an example embodiment.

In step 110, an intermediary computer receives, from a client computer, a request with one or more values. The request may include one or more values that can be used to determine whether a platform-specific application is being executed natively by the target computer platform or by an emulator on a non-target client-computer platform. For example, an emulator filter on a server computer may receive an HTTP request, from a client computer, that includes an answer to a survey question.

2.1 Determining Whether a Request is from a Native Application

In step 120, the intermediary computer determines whether the request is from a platform-specific application. If so, then control may proceed to step 130; otherwise control may proceed to step 180 and perform a negative action (discussed further herein). An emulator filter may determine whether a request is from a platform-specific application based on one or more features in the request. For example, a request may identify or include one or more servers, ports, domains, protocols, resources, paths, queries, parameters, credentials, values, platform-specific application identifier or one or more other features associated with platform-specific application. Those associations may be stored in a configuration or storage system (discussed further herein). If a request identifies or includes one or more particular features associated with a platform-specific application, then the emulator filter may determine that the request is from a platform-specific application or for protected resource and proceed to step 130; otherwise, the emulator filter may determine that the request is not from a platform-specific application and proceed to step 180 and perform a negative action. In an embodiment, if a request is received from a client computer, the emulator filter may assume the request is from a platform-specific application and proceed directly to step 130.

2.2 Determining Whether the Native Application is being Executed by a Target Computer Platform or an Emulator In step 130, the intermediary computer determines whether the platform-specific application, which sent the request, is being executed by an emulator on a computer platform that is not a target computer platform for the platform-specific application. A request may include one or more signals comprising values, characteristics, or other data that indicate whether the platform-specific application is being executed by an emulator or natively on a target client-computer platform. In response to determining that the request is from a platform-specific application executed by an emulator, control may proceed to step 180 and perform a negative; otherwise, control may proceed to step 190 and perform a positive action (discussed further herein). In an embodiment, in response to determining that the request is from a platform-specific application executed by a target client-computer platform, control may proceed to step 190 and perform a positive action; otherwise, control may proceed to step 180 and perform a negative action.

One or more methods may be used for reliably determining if a platform-specific application is being executed natively or not. For example, a platform-specific application may include code (referred to herein as "fingerprinting code") that when executed determines and generates data indicating whether the platform-specific application is being executed natively or not. Fingerprinting code may comprise conditionally executed code, code that checks for hard-to-simulate components, or one or more other methods. The platform-specific application may include the data generated from the fingerprinting code in one or more requests sent to the emulator filter. The emulator filter may use the data to determine whether the requests are from a platform-specific application running by a target client-computer platform (natively) or an emulator on a non-target client-computer platform (not natively). One or more values generated from fingerprinting code may be referred to as one or more "fingerprinting values".

Fingerprinting code may be configured to periodically produce a different set of one or more values using a different set of one or more methods over time. For example, fingerprinting code may comprise code that when executed during a first period of time generates data indicating whether the platform-specific application is being executed natively or not using conditionally executed code. The fingerprinting code may comprise code that when executed during a second period of time generates data indicating whether the platform-specific application is being executed natively or not by attempting to discover or use hard-to-simulate hardware or software components. The fingerprinting code may comprise code that when executed periodically downloads a new set of code from a server computer. When executed, the new code may be configured to generate new or different set of data indicating whether the platform-specific application is being executed natively or not. The new or different set of data may be in one or more new or different formats, variables, objects, or other data or data structure. The new code may be configured to generate the new or different set of data using one or more new or different methods.

2.2.1 Conditionally Executed Code

Snippet 1 comprises conditionally executed code, which when compiled for, or executed by, one or more target client-computer platforms or an emulator can be used to determine whether the platform-specific application is being executed natively or not.

Snippet 1:
line 01: #include "PlatformIdentifiers.h"
line 02: #if (MOBILE_PHONE_SIMULATOR)
line 03: // Executed by first known emulator
line 04: #elseif (MOBILE_TABLET_EMULATOR)
line 05: // Executed by second known emulator
line 06: #elseif (TARGET_PHONE||TARGET_TABLET)
line 07: // Executed by target computer platform
line 08: #else
line 09: // Running unknown emulator
line 10: #endif In line 1, a library is included in the platform-specific application. The library may define one or more identifiers, macros, functions, other data or logic that is associated with, or can identify, one or more particular computer platforms or emulators. The code in line 2 uses a first particular function defined in the library in line 1 ("MOBILE_PHONE_SIMU-LATOR"). When the first particular function is executed, the platform-specific application calls an Application Programming Interface ("API") provided by the target client-computer platform or an emulator executing the platform-specific application. The target client-computer platform or emulator may return a value. The first particular function may determine if the returned value is a particular value associated with a particular mobile phone simulator; if so, then control may proceed to execute the code in line 3, which is not shown. However, the code in line 3 may generate data indicating that the platform-specific application is not being executed natively, or is being executed by a particular phone simulator. For example, the data may include the name of the emulator. The data may be included in one or more subsequent requests that are sent to, and processed by, an emulator filter. Accordingly, the emulator filter may determine that the one or more requests are from the platform-specific application executed by the particular phone emulator.

If the first particular function determines that the returned value is a particular value that is not associated with the particular mobile phone emulator or simulator (indicating that the platform-specific application is being executed by a target client-computer platform or another emulator), then control may proceed to execute the code in line 4. The code in line 4 uses a second particular function defined in the library in line 1 ("MOBILE_TABLET_EMULATOR"). When the second particular function is executed, the platform-specific application calls the API provided by the target client-computer platform or an emulator executing the platform-specific application. The target client-computer platform or emulator may return a value. The second particular function may determine if the returned value is a particular value associated with a particular mobile tablet emulator; if so, then control may proceed to execute the code in line 5, which is not shown. However, the code in line 5 may generate data indicating that the platform-specific application is not being executed natively, or is being executed by a particular tablet emulator. The data may be included in one or more subsequent requests that are sent to, and processed by, an emulator filter. Accordingly, the emulator filter may determine that the one or more requests are from the platform-specific application executed by the particular tablet emulator.

If the second particular function determines that the returned value is a particular value that is not associated with the particular mobile tablet simulator (indicating that the platform-specific application is being executed by a target client-computer platform or another emulator), then control may proceed to execute the code in line 6. The code in line 6 uses a third function defined in the library in line 1 ("TARGET_PHONE"). When the third particular function is executed, the platform-specific application calls the API provided by the target client-computer platform or an emulator executing the platform-specific application. The target client-computer platform or emulator may return a value. The third particular function may determine if the returned value is a particular value associated with a particular target mobile phone computer platform; if so, then control may proceed to execute the code in line 7, which is not shown. However, the code in line 7 may generate data indicating that the platform-specific application is being executed natively, or is being executed by the particular target mobile phone computer platform. The data may be included in one or more subsequent requests that are sent to, and processed by, an emulator filter. Accordingly, the emulator filter may determine that the one or more requests are from the platform-specific application executed by the particular target phone client-computer platform.

If third particular function determines that the returned value is a particular value that is not associated with the particular mobile phone computer platform (indicating that the platform-specific application is being executed by a target client-computer platform or another emulator), then control may proceed to execute the other function in line 6. The code in line 6 uses a fourth function defined in the library in line 1 ("TARGET_TABLET"). When the fourth particular function is executed, the platform-specific application calls the API provided by the target client-computer platform or an emulator executing the platform-specific application. The target client-computer platform or emulator may return a value. The fourth particular function may determine if the returned value is a particular value associated with a particular target mobile tablet computer platform; if so, then control may proceed to execute the code in line 7, which is not shown. However, the code in line 7 may generate data indicating that the platform-specific application is being executed natively, or is being executed by the particular target mobile tablet computer platform. The data may be included in one or more subsequent requests that are sent to, and processed by, an emulator filter. Accordingly, the emulator filter may determine that the one or more requests are from the platform-specific application executed by the particular target tablet client-computer platform.

If fourth particular function determines that the returned value is a particular value that is not associated with the particular mobile tablet computer platform (indicating that the platform-specific application is being executed by a target client-computer platform or another emulator), then control may proceed to execute the code in line 9. In the example in Snippet 1, in line 9, the platform-specific application may pessimistically determine that the platform-specific application is being executed in an unknown emulator and execute code that generates data indicating that the platform-specific application is being executed in an unknown emulator. In an embodiment, the platform-specific application may optimistically determine that the platform-specific application is being executed natively in a target client-computer platform and execute code that generates data indicating that the platform-specific application is being executed natively in a target client-computer platform. The data may be included in one or more subsequent requests that are sent to, and processed by, an emulator filter. Accordingly, the emulator filter may determine that the one or more requests are from the platform-specific application executed by an unknown emulator.

2.2.2 Code that Checks for Hard-to-Simulate Components

As discussed herein, a computer platform is a particular set of hardware or software components. One computer platform can include one or more different processors, chipsets, peripheral components, operating systems, displays, inputs, or other hardware or software components that another computer platform does not have. A platform-specific application may include fingerprinting instructions, which when executed query for, or interact with, one or more hardware or software components on a target client-computer platform that are difficult to simulate. For example, one or more target computer platforms may provide specialized components, such as a global positioning system ("GPS") or camera. A platform-specific application may use one or more target-computer-platform-specific APIs to request data from a GPS or camera on the target platform. If valid GPS data or camera data is returned, indicating that the computer platform has those components, then the platform-specific application may determine, and generate data indicating, that the platform-specific application is being executed by a target client-computer platform. If no valid GPS or camera data is returned, or if data indicating that a GPS or camera is accessible, then the platform-specific application may determine, and generate data indicating, that the platform-specific application is being executed in an emulator. The data may be included in one or more subsequent requests that are sent to, and processed by, an emulator filter.

An emulator may not provide all of the interfaces or functionality provided by a target computer platform. However, an emulator may simulate one or more interfaces, features, hardware, or software components provided by the emulated target computer platform by providing one or more default, pre-defined, user-selected, or other particular values in response to an attempt by the platform-specific application to interface with, or query for, a hardware or software component that is not available by the underlying computer platform. For example, if a target computer platform includes a GPS system, the non-target computer platform that is executing the emulator does not include a GPS system, and the emulator receives a call from a platform-specific application for GPS coordinates, then the emulator may simulate a GPS by returning one or more default or user-selected values even though the one or more default or user-selected values would not be based data gathered from a GPS. The platform-specific application may the call one or more additional times. If the same values are returned each time, then the platform-specific application may generate data indicating the same or that the platform-specific application is being executed by an emulator. The data may be included in one or more subsequent requests that are sent to, and processed by, an emulator filter.

Simulating a GPS system or indicating that the platform does not have access to the GPS system may be a valid response for the platform-specific application and allow the platform-specific application to continue executing within emulator. However, in response to receiving data that the platform-specific application does not have access to a GPS or camera the emulator filter may perform a negative action.

2.2.3 Sending Data to an Emulator Filter

The data sent to an emulator filter from a platform-specific application may be transmitted using one or more secure or encrypted protocols. For example, a platform-specific application may append a digital signature to data sent to an emulator filter using secret recipe. For purposes of illustrating a clear example, assume the following:

The platform-specific application is being executed by a target client-computer platform;

The platform-specific application identifies the target client-computer platform with the value "platform-a".

The platform-specific application may send a request that includes a parameter names "platform" and a value that identifies the target client-computer platform, which in this example is "platform-a". Accordingly, the request may include "platform: platform-a". The platform-specific application may generate a digital signature based on a cryptographic hashing function and one or more features, such as the parameter name, parameter value, a time or timestamp generated by the platform-specific application, or one or more other values. The digital signature can be appended to the platform identifier in a request sent to an emulator filter. If an emulator filter receives a request with an invalid digital signature, then the emulator filter may perform a negative action. An example of an emulator filter determining whether a digital signature is valid is discussed further herein.

The data, digital signature, methods used to generate the data or digital signature, or the hardware or software components that are used to generate data for an emulator filter to determine whether a platform-specific application is being executed natively or by an emulator may be changed over time based on a pre-defined schedule. Accordingly, a digital signature for a request with the same data may change over time. The schedule may be stored in a configuration or storage system, and may be configurable by one or more users or administrators. The schedule may be retrieved by an emulator filter or the platform-specific application from the storage system. Additionally or alternatively, the schedule may be sent from the emulator filter to the platform-specific application over one or more protected, secure, or encrypted protocols.

3.0 Example Network Topology for Determining Whether a Request is from a Native Application Executed by the Target Client Computer Platform or by an Emulator FIG. 2 illustrates a computer system for determining whether a request is from a platform-specific application executed by a target computer platform or an emulator on a non-target computer platform, in an example embodiment. In FIG. 2, system 200 comprises client-computer platform 210, client-computer platform 220, intermediary computer 230, storage 240, and server infrastructure 290 communicatively coupled over a plurality of interconnected computer networks.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

While each of the components listed above is illustrated as if running on a separate, remote computer from each other, one or more of the components listed above may be part of or executed on the same computer. For example, intermediary computer 230, storage 240, or server infrastructure 290 may be executed on the same computer, local area, or wide area network. Additionally or alternatively, intermediary computer 230 may be a proxy server or layer for server infrastructure 290. Additionally or alternatively, intermediary computer 230 may be in line between a router and server infrastructure 290, such that intermediary computer 230 may intercept all network data sent to, or sent from, server infrastructure 290 over one or more protocols. Additionally or alternatively, intermediary computer 230, or one or more modules comprising intermediary computer 230 discussed herein, may be a software layer between, or executed on, server infrastructure 290 or a component of server infrastructure 290. Additionally or alternatively, intermediary computer 230, or one or more modules comprising intermediary computer 230 discussed herein, may be part of a server-side application that responds to requests over one or more standard or proprietary protocols, such as HTTP or any other protocol.

3.1 Client-Computer Platforms

Client-computer platform 210 and client-computer platform 220 are two different computer platforms comprising particular hardware and software configurations that are different than the other. Client computer platform 210 comprises mobile device 212, mobile operating system ("mobile OS") 214, and mobile application 205-1. Mobile application 205-1 is a platform-specific application, and client-computer platform 210 is a target platform for mobile application 205-1.

Client-computer platform 220 comprises desktop computer 222, desktop operating system ("desktop OS") 224, emulator 226, and mobile application 205-2. Mobile application 205-2 is a copy of mobile application 205-1. Accordingly, mobile application 205-2 is a platform-specific application for one or more target computer platforms, but client-computer platform 220 is not a target platform for mobile application 205-2. Client-computer platform 220 is not configured execute mobile application 205-2 with mobile device 212 and desktop OS 224 without emulator 226.

3.2 Server Infrastructure

Server infrastructure 290 may comprise one or more server computers that receive requests from one or more computers or computer platforms, such as client-computer platform 210, client-computer platform 220, or intermediary computer 230. Server infrastructure 290 may respond by sending data to the client computer that made the request. The one or more computers in server infrastructure 290 may, but need not, be owned or managed by one or more independent entities and may span across one or more computer networks.

A server computer may be a computer that receives requests for data and responds with data. For example, a server computer may be an HTTP-based computer that receives HTTP requests and responds with structured data or instructions comprising JSON, HTML, CSS, or JavaScript instructions. A request may include data that is being submitted to a server computer. Additionally or alternatively, a request may be for a set of data stored, hosted, or served by a server computer.

3.3 Emulator

An emulator may be software or hardware on a computer platform that emulates or simulates hardware or software components of a target computer platform. However, the emulator is executed by a different underlying computer platform. For example, emulator 226 may be software executed by desktop OS 224 on desktop computer 222. Emulator 226 may provide one or more interfaces or functions provided by client-computer platform 210 that are not provided or supported by desktop computer 222 or desktop OS 224. Emulator 226 may be a specialized application, and desktop OS 224 on desktop computer 222 may be the target platform for emulator 226.

Emulator 226 need not provide all of the interfaces or functionality provided by a target computer platform. Emulator 226 may provide one or more default, pre-defined, user-selected values in response to a request for a hardware or software component that is not available by the underlying computer platform. For example, if mobile device 212 includes a GPS system, desktop computer 222 does not include a GPS system, and emulator 226 receives a call from mobile application 205-2 for GPS coordinates, then emulator 226 may simulate a GPS by returning one or more default or user-selected values even though the one or more default or user-selected values would not be based data gathered from a GPS. Additionally or alternatively, emulator 226 may respond to the call for GPS coordinates with data indicating that client-computer platform 220 or a component therein does not have a GPS system. Simulating a GPS system or indicating that the platform does not have access to the GPS system may be a valid response for mobile application 205-2 and allow mobile application 205-2 to continue executing within emulator 226.

3.4 Emulator Filter and Intermediary Computer

Although an emulator emulates a particular target computer platform, a non-target computer platform with the emulator is not completely equivalent to the particular target computer platform. For example, desktop computer 222, desktop OS 224, and emulator 226 do not create a computer platform that is completely functionally equivalent to client-computer platform 210, because emulator 226 may perform one or more operations differently than client-computer platform 210 or may not provide one or more operations provided by client-computer platform 210. Detecting one or more differences allows intermediary computer 230 or emulator filter logic 232 (discussed further herein) to determine whether a request is from a platform-specific application being executed in an emulator or a platform-specific application being executed in a target computer platform.

Intermediary computer 230 may be a computer that is logically between server infrastructure 290 and one or more client-computer platforms. Intermediary computer 230 comprises emulator filter logic 232. Emulator filter logic 232 may be hardware or software that receives one or more requests from one or more platform-specific applications, and filters the one or more requests based on whether the request is (1) from a platform-specific application being executed on a target platform or (2) a platform-specific application that is being executed within an emulator on a non-target platform. Emulator filter logic 232 may filter requests based on other factors discussed further herein. If a request satisfies emulator filter logic 232 then emulator filter logic 232 may perform a positive action (discussed further herein); otherwise, emulator filter logic may perform a negative action (discussed further herein).

Intermediary computer 230 that one or more domain name servers or other elements of the domain name system ("DNS") identify in DNS records as a destination network address associated with one or more internet domain names. Accordingly, intermediary computer 230 or intermediary computer 230 may receive requests sent to the one or more domains client-computer platforms. Based on using DNS to resolve the domain name in a request to a network address, intermediary computer 230 may forward the request, or a modified request, to a server computer in server infrastructure 290.

In the embodiment illustrated in FIG. 2, emulator filter logic 232 is on a separate computer from server infrastructure 290. However, emulator filter logic 232 may part of, but logically between, server infrastructure 290 and one or more client-computer platforms.

3.5 Storage and Configuration

Storage 240 may be volatile or non-volatile computer readable media communicatively coupled to intermediary computer 230 or emulator filter logic 232. In FIG. 2, storage 240 is illustrated as a separate computer system communicatively coupled to intermediary computer 230. However, in another embodiment, storage 240 may be persistent storage that is part of, or communicatively coupled to, intermediary computer 230 or server infrastructure 290.

Storage 240 comprises Configuration 242. Configuration 242 may be a database, a configuration file, or any other system that stores one or more settings, preferences, policies, or protocols. Configuration 242 may store more than one configuration for one or more server computers in server infrastructure 290. For example, configuration 242 may include data that indicates requests for one or more server computers or resources provided by a server computer in server infrastructure 290 may, or need not, be filtered. A resource may be hardware, software, or data identified by the request. Additionally or alternatively, configuration 242 may include data that identifies one or more client computers that are on a blacklist or one or more client computers that are on a whitelist. Configuration 242 may be created or modified by intermediary computer 230, emulator filter logic 232, or a user or administrator through one or more computers, such intermediary computer 230, a computer in server infrastructure 290, a client computer, or one or more other computers not illustrated in FIG. 2.

4.0 Process Overview for Enforcing Platform Policies

Figure 3:
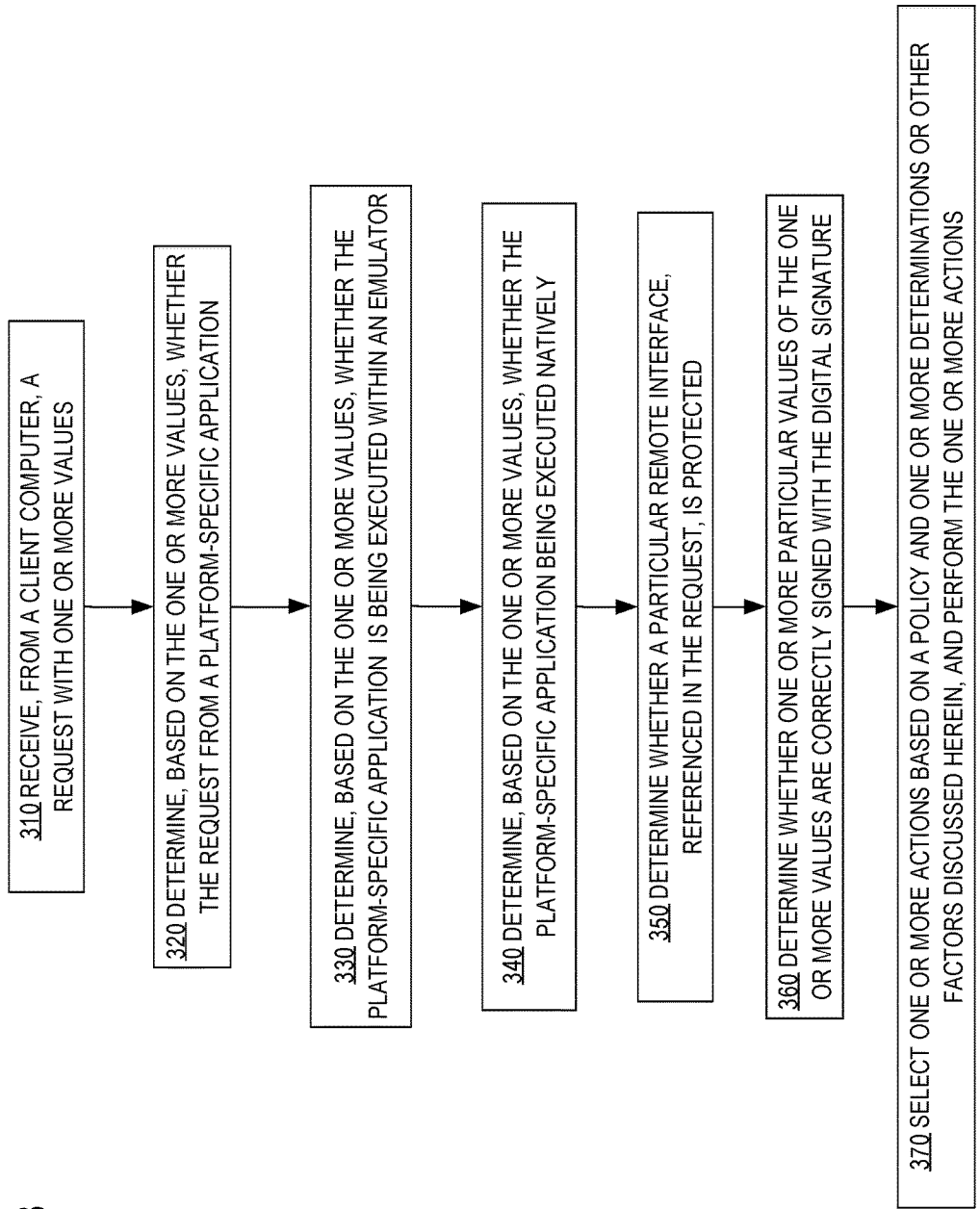
FIG. 3 illustrates a process to filter a request from a platform-specific application using a set of rules in a policy, in an example embodiment.

While some attackers may use emulators to send malicious requests to one or more server computers, developers or other users may use an emulator to test or perform other legitimate tasks with a platform-specific application. An emulator filter can implement one or more policies that define how to respond to requests from a platform-specific application based on whether the requests are determined to be from a platform-specific application executed by a target client-computer platform or an emulator, whether the emulator is trusted, whether the client computer is a trusted client computer, or based on one or more other factors, features, or values discussed herein. FIG. 3 illustrates a process to filter a request from a platform-specific application using a set of rules in a policy, in an example embodiment.

4.1 Receiving One or More Requests from One or More Platform-Specific Applications In step 310, an intermediary computer receives, from a client computer, a request with one or more values. For purposes of illustrating a clear example, assume the following:

Mobile application 205-1 and mobile application 205-2 are copies of a platform-specific mobile application that is compiled or configured to be executed on one or more target systems, which include target client-computer platform 210, but not client-computer platform 220.

Mobile application 205-2 includes and executes fingerprinting instructions that includes platform-conditionally executed code and code that checks for hard to simulate hardware or software components, which in this example includes a GPS;

Mobile application 205-2 sends a first request, to emulator filter logic 232, with the following path to a resource: "/survey/2/answer/new";

The first request further includes data that includes or identifies a first answer to a survey question, the Internet Protocol ("IP") address of mobile application 205-2, a first value ("F") indicating that mobile application 205-2 is being executed in a computer platform that does not have a GPS, a particular emulator executing mobile application 205-2, and a first digital signature based on the first value;

Mobile application 205-1 includes and executes fingerprinting instructions that includes platform-conditionally executed code and code that check for hard to simulate hardware or software components, which in this example includes a GPS;

Mobile application 205-1 sends a second request, to emulator filter logic 232, with the following path to a resource: "/survey/1/answer/new";

The second request further includes data that includes or identifies a second answer to a survey question, the IP address of mobile application 205-1, a second value ("T") indicating that mobile application 205-1 is being executed in a computer platform that has a GPS, mobile application 205-1 is being executed natively in a particular operating system, and a second digital signature based on the second value;

Configuration 242 indicates a resource identified by the following path is a protected resource for one or more platform-specific applications: "/survey/*/answer/new", where the asterisk is a wildcard character;

Accordingly, emulator filter logic 232 may receive the first request and second request.

In step 320, the intermediary computer determines, based on the one or more values, whether the request from a platform-specific application. For example, emulator filter logic 232 may determine that the first request is from a platform-specific application because the first request includes a path ("/survey/2/answer/new") that matches a path to a resource for one or more platform-specific applications ("/survey/*/answer/new"). Similarly, emulator filter logic 232 may determine that the second request is from a platform-specific application because the second request includes a path ("/survey/1/answer/new") that matches a path to a protected resource ("survey/*/answer/new").

4.2 Determining Whether the Request is from a Platform-Specific Application Executed by an Emulator or a Target Client-Computer Platform In step 330, the intermediary computer determines, based on the one or more values, whether the platform-specific application is being executed within an emulator. For example, emulator filter logic 232 may determine that the platform-specific application is being executed by an emulator based on the first request including the first value "F" indicating that mobile application 205-2 is being executed in a computer platform that does not have a GPS, and includes data that indicates that mobile application 205-2 is being executed in a particular emulator that is configured to be executed on a desktop OS.

In step 340, the intermediary computer determines, based on the one or more values, whether the platform-specific application is being executed natively. For example, emulator filter logic 232 may determine that the second request is from a platform-specific application being executed by a target client-computer platform based on the second request including the first value "T" indicating that mobile application 205-1 is being executed in a computer platform that has a GPS, and includes data that indicates that mobile application 205-1 is being executed natively in a particular target mobile OS. In this example, emulator filter logic 232 need not determine that the first request is from a platform-specific application being executed by a target client-computer platform, because emulator filter logic 232 already determined that the first request was from a platform-specific application being executed by an emulator.

4.3 Determining Whether Remote Interface is Protected

In step 350, the intermediary computer determines whether a particular remote interface, referenced in the request, is protected. For example, emulator filter logic 232 may determine that the first request for a protected resource or interface because the first request includes a path ("/survey/2/answer/new") that matches a path to a protected resource ("/survey/*/answer/new"). Similarly, emulator filter logic 232 may determine that the second request for a protected resource or interface because the second request includes a path ("/survey/1/answer/new") that matches a path to a protected resource ("/survey/*/answer/new").

4.4 Determining Whether Value(S) are Correctly Signed

In step 360, the intermediary computer determines whether one or more particular values of the one or more values are correctly signed with the digital signature. Continuing with the previous example, emulator filter logic 232 may know the method(s) or schedule(s) that platform-specific mobile application 205-1 and platform-specific mobile application 205-2 use to generate digital signatures. Accordingly, emulator filter logic 232 may generate a first verification signature based on the value ("F") in the first request using the same one or more methods used by mobile application 205-2. Emulator filter logic 232 may determine that the first request was properly signed if the first verification signature matches the first digital signature in the first request. Similarly, emulator filter logic 232 may generate a second verification signature based on the value ("T") in the second request using the same one or more methods used by mobile application 205-1. Emulator filter logic 232 may determine that the second request was properly signed if the second verification signature matches the second digital signature in the second request.

4.5 Determining One or More Actions Based on a Policy and Results of One or More Determinations, and Perform the One or More Actions In step 370, the intermediary computer selects one or more actions based on a policy and one or more determinations or other factors discussed herein, and performs the one or more actions. A policy may be associated with a resource, domain, server computer, platform-specific application, or one or more features discussed herein. Table 1 illustrates a policy with rules to determine how emulator filter logic 232 responds to each request, received from a platform-specific application, matches a path to a resource, in an example embodiment. In this example, assume the path to the resource is the same as the protected resource in this example ("/survey/*/answer/new"). Table 1 indicates what actions emulator filter logic 232 may perform in response to receiving a request based on: whether the request that is determined to be from a platform-specific application, the platform-specific application is executed by a target client-computer platform or an emulator, the IP address of the requesting client computer, or one or more data values or features in the request, or one or more determinations derived from the data in the request or related to the request. While Table 1 illustrates a particular embodiment for purposes of illustrating a clear example, other embodiments may omit, add to, reorder, or modify any of the rules, names, actions, factors, values, features, or other elements in Table 1.

TABLE 1

| # | Rule Name | Match Criteria | Actions |
|---|---|---|---|
| 1 | Trusted Source Platform-Specific Application being executed natively | Source IP: any<br>Request data: value "T" in request<br>Client-Computer Platform: Target Mobile Operating System<br>Resource: any<br>Digital Signature: valid<br>Domain in request: any<br>Client attributes in HTTP header: any | Positive: forward request |
| 2 | Trusted Source Developer A | Source IP: subnet 20.20.20.0/24<br>Request data: value "T" in request<br>Client-Computer Platform: Phone Simulator 1 on OS 1<br>Resource: any | Positive: forward request |
| 3 | Trusted Source Developer B | Source IP: any<br>Request data: value "(A and B) or C" in request<br>Client-Computer Platform: any | Positive: forward request |
| 4 | Trusted Source Developer C | Source IP: 50.50.50.1-50.50.50.200<br>Request data: value "A or B or C" in request<br>Client-Computer Platform: any<br>Resource: any | Positive: forward request |
| 5 | Trusted Emulator | Source IP: any on whitelist<br>Request data: any<br>Client-Computer Platform: Tablet Simulator 2 on any version of a particular OS<br>Resource: any | Positive: forward and log request |
| 6 | Untrusted Emulator | Source IP: any<br>Request data: any<br>Client-Computer Platform: any | Negative: terminate request |

TABLE 1-continued

| # | Rule Name | Match Criteria | Actions |
|---|-----------|----------------|---------|
| 7 | Untrusted Emulator | emulator on any desktop OS Resource: /survey/*/answer/new Source IP: any on a blacklist Request data: any Client-Computer Platform: any Resource: any | Negative: terminate and log request |
| 8 | Untrusted Emulator | Source IP: any Request data: any Client-Computer Platform: any Resource: any Digital signature: invalid | Negative: add to blacklist computer and log request |

Table 1 can be stored in configuration 242 and associated with a domain or one or more server computers in server infrastructure 290. In response to receiving user input identifying one or more policies, rules, rule criteria, or actions, emulator filter logic 232 may update a policy or rule, or create a new policy or rule, that includes the one or more rules or one or more actions in configuration 242. Additionally or alternatively, in response to receiving user input identifying one or more policies or rules, emulator filter logic 232 may delete the one or more policies or the one or more rules in configuration 242. Emulator filter logic 232 can retrieve Table 1 from storage 240. In response to receiving a request for the particular domain or the one or more server computers, emulator filter logic 232 may retrieve Table 1 from storage 240, analyze the request to determine which rule in Table 1 matches the request. In response to determining that the request matches one or more rules, emulator filter logic 232 may take the action(s) in each of the one or more matching rules.

Returning to FIG. 3, in step 370, the intermediary computer selects one or more actions based on a policy and one or more determinations or other factors discussed herein, and performs the one or more actions. Continuing with the example in the previous steps and including Table 1, emulator filter logic 232 may select one or more rules from Table 1 based on one or more determinations discussed herein relating to the first request or the computer, application, or platform that sent the first request, or one or more other data or features discussed herein, and the match criteria for each rule in Table 1. Emulator filter logic 232 may select rule 6 and rule 7, the criteria for which are both satisfied by the first request. Accordingly, emulator filter logic 232 may perform a negative action comprising: terminating the first request without forwarding the first request to server infrastructure 290, adding an identifier of desktop computer 222 (such as an IP address, subnet, or X-Forwarded-For address associated with desktop computer 222) to a blacklist, and adding data about the request in a log. If emulator filter logic 232 receives a third request, and the third request is from desktop computer 222, then emulator filter logic 232 may match the request with Rule 7, and in response, terminate and log the request.

In response to the second request, emulator filter logic 232 may select one or more rules from Table 1 based on one or more determinations discussed herein relating to the second request or the computer, application, or platform that sent the second request, or one or more other data or features discussed herein, and the match criteria for each rule in Table 1. Emulator filter logic 232 may select rule 1, which has criteria that is satisfied by the second request. Accordingly, emulator filter logic 232 may perform a positive action comprising: forwarding the request to server infrastructure 290, receiving any data from server infrastructure 290 in response to the forwarded request, send the data to mobile application 205-1, adding an identifier of mobile device 212 to a whitelist, and adding data about the request in a log.

If emulator filter logic 232 receives a request from mobile application 205-1 on mobile device 212, then emulator filter logic 232 may determine that an identifier associated with mobile device 212 is in the whitelist. In response to determining that the identifier associated with mobile device 212 is in the whitelist, emulator filter logic 232 may perform one or more positive actions.

4.6 Negative Actions

A negative action may comprise one or more responses discussed herein. For example, a negative action may comprise one or more of the following: terminating the request without forwarding the request to a server computer; logging a request in storage 240; redirecting the request to a warning page or a page with data that appears to be the data requested, but is not the data requested; adding an identifier of the client computer that sent the request to a blacklist; or one or more other responses discussed herein. Logging a request as a negative action need not cause the request to be terminated. Accordingly, a negative action may comprise logging a request, but still forwarding the request to a server computer, and returning and results from the server computer to the client computer.

4.7 Positive Actions

A positive action may comprise one or more responses discussed herein. For example, a positive action may comprise one or more of the following: forwarding the request to a server computer, receive a set of data in response to the request, and send the results to the client computer that send the request; logging a request; adding an identifier of the client computer that sent the request to a whitelist; or one or more responses discussed herein.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 4:
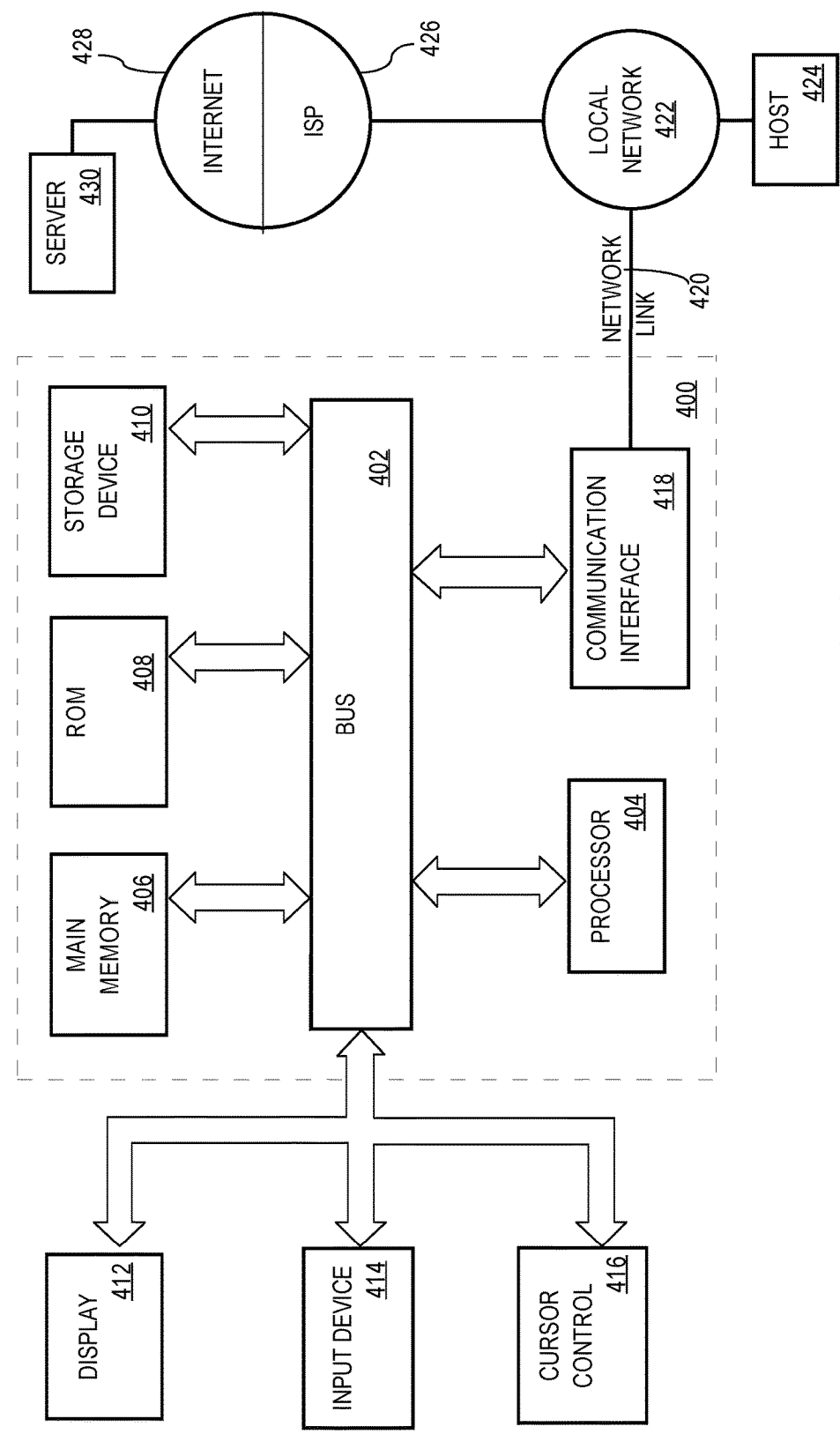
FIG. 4 illustrates a computer system upon which an embodiment may be implemented.

For example, FIG. 4 is a block diagram that illustrates a computer system 500 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, or stored in storage device 410, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system for improving security of a computing device comprising:
   one or more processors;
   one or more memory devices coupled to the one or more processors and storing a set of security instructions which, when executed by the one or more processors, cause the one or more processors to perform:
   receiving a request from a platform-specific application compiled for a first computer platform;
   determining, based on the request, whether the platform-specific application is being executed natively on the first computer platform or being executed within an emulator on a second computer platform that is different from the first computer platform;
   determining one or more actions to perform based on whether the platform-specific application is being executed natively on the first computer platform or being executed within the emulator on the second computer platform;
   performing the one or more actions.

2. The computer system of claim 1 wherein the platform-specific application includes one or more fingerprinting instructions which, when executed, generates fingerprinting data indicating whether the platform-specific application is being executed natively or being executed within the emulator on the second computer platform, and includes the fingerprinting data in the request.

3. The computer system of claim 2 wherein generating the fingerprinting data comprises calling one or more application programming interfaces (APIs) provided by one or more respective computer platforms and/or emulators.

4. The computer system of claim 2 wherein generating the fingerprinting data comprises determining that the platform-specific application is not being executed in a known emulator, and in response, generating fingerprint data indicating that the platform-specific application is being executed in an unknown emulator.

5. The computer system of claim 2 wherein generating the fingerprinting data comprises determining that the platform-specific application is not being executed in a known emulator, and in response, generating fingerprint data indicating that the platform-specific application is being executed natively.

6. The computer system of claim 2 wherein generating the fingerprinting data comprises querying for at least one of: one or more particular hardware components or one or more particular software components.

7. The computer system of claim 6 wherein generating the fingerprinting data comprises querying for one or more particular hardware components, wherein the first computer platform includes the one or more particular hardware components, and wherein the second computer platform does not include the one or more particular hardware components.

8. The computer system of claim 6 wherein generating the fingerprinting data comprises querying for one or more particular software components, wherein the first computer platform includes the one or more particular software components, and wherein the second computer platform does not include the one or more particular software components.

9. The computer system of claim 1 wherein the request includes a digital signature, and wherein the set of security instructions, when executed by the one or more processors, further cause validating the digital signature.

10. The computer system of claim 1 wherein the set of security instructions, when executed by the one or more processors, further cause:
    storing a plurality of rules, wherein each rule in the plurality of rules specifies one or more match criteria and one or more actions;
    determining that the request satisfies match criteria for a particular rule of the plurality of rules, wherein the match criteria for the particular rule includes whether the platform-specific application is being executed natively on the first computer platform or being executed within the emulator on the second computer platform, and wherein the particular rule specifies the one or more actions.

11. A computer-implemented method for providing improvements in security for computer devices, the method comprising:
    receiving a request from a platform-specific application compiled for a first computer platform;
    determining, based on the request, whether the platform-specific application is being executed natively on the first computer platform or being executed within an emulator on a second computer platform that is different from the first computer platform;
    determining one or more actions to perform, based on whether the platform-specific application is being executed natively on the first computer platform or being executed within the emulator on the second computer platform;
    performing the one or more actions.

12. The method of claim 11 wherein the platform-specific application includes one or more fingerprinting instructions which, when executed, generates fingerprinting data indicating whether the platform-specific application is being executed natively or being executed within the emulator on the second computer platform, and includes the fingerprinting data in the request.

13. The method of claim 12 wherein generating the fingerprinting data comprises calling one or more application programming interfaces (APIs) provided by one or more respective computer platforms and/or emulators.

14. The method of claim 12 wherein generating the fingerprinting data comprises determining that the platform-specific application is not being executed in a known emulator, and in response, generating fingerprint data indicating that the platform-specific application is being executed in an unknown emulator.

15. The method of claim 12 wherein generating the fingerprinting data comprises determining that the platform-specific application is not being executed in a known emulator, and in response, generating fingerprint data indicating that the platform-specific application is being executed natively.

16. The method of claim 12 wherein generating the fingerprinting data comprises querying for at least one of: one or more particular hardware components or one or more particular software components.

17. The method of claim 16 wherein generating the fingerprinting data comprises querying for one or more particular hardware components, wherein the first computer platform includes the one or more particular hardware components, and wherein the second computer platform does not include the one or more particular hardware components.

18. The method claim 16 wherein generating the fingerprinting data comprises querying for one or more particular software components, wherein the first computer platform includes the one or more particular software components, and wherein the second computer platform does not include the one or more particular software components.

19. The method of claim 11 wherein the request includes a digital signature, the method further comprising validating the digital signature.

20. The method of claim 11 further comprising:
    storing a plurality of rules, wherein each rule in the plurality of rules specifies one or more match criteria and one or more actions;
    determining that the request satisfies match criteria for a particular rule of the plurality of rules, wherein the match criteria for the particular rule includes whether the platform-specific application is being executed natively on the first computer platform or being executed within the emulator on the second computer platform, and wherein the particular rule specifies the one or more actions.

* * * * *